US006434879B1

(12) United States Patent
Safwat et al.

(10) Patent No.: US 6,434,879 B1
(45) Date of Patent: Aug. 20, 2002

(54) BI-DIRECTIONAL, MANUFACTURABLE, LIFT-GENERATING MESH BAR

(75) Inventors: Sherif Safwat, Davis, CA (US); Valentin G. Perevoshchikov, Kaliningrad (RU)

(73) Assignee: OTTER Ultra-Low-Drag, Ltd., George Town (KY)

( * ) Notice: Subject to any disclaimer, the term of this patent is extended or adjusted under 35 U.S.C. 154(b) by 0 days.

(21) Appl. No.: 09/601,543

(22) PCT Filed: Feb. 10, 1999

(86) PCT No.: PCT/US99/02820
§ 371 (c)(1),
(2), (4) Date: Feb. 21, 2001

(87) PCT Pub. No.: WO99/39572
PCT Pub. Date: Aug. 12, 1999

Related U.S. Application Data
(60) Provisional application No. 60/074,220, filed on Feb. 10, 1998, and provisional application No. 60/084,103, filed on May 4, 1998.

(51) Int. Cl.[7] .......................... A01K 73/02; A01K 73/04
(52) U.S. Cl. ................ 43/9.95; 43/7; 66/195; 66/169 R; 210/241; 112/440
(58) Field of Search ..................... 43/9; 66/195, 169 R; 210/241; 112/440

(56) References Cited

U.S. PATENT DOCUMENTS

| | | |
|---|---|---|
| 1,552,269 A | 9/1925 | Brocker |
| 2,590,586 A | 3/1952 | Thompson, Jr. et al. |
| 2,792,617 A | 5/1957 | Haller |

(List continued on next page.)

FOREIGN PATENT DOCUMENTS

| | | |
|---|---|---|
| DE | 3543253 A1 | 6/1987 |
| FR | 002521065 A | 8/1983 |
| JP | 57-13660 | 3/1982 |

(List continued on next page.)

OTHER PUBLICATIONS

Batill, S.M., et al., "Flow Field Studies on Yawed, Stranded Cables," in *Flow Visualization* V, R. Řezniček ed., Hemisphere Publishing Corp., pp. 391–396 (1990).
Mehta, Rabindra D., "Aerodynamics of Sports Balls," *Ann. Rev. Fluid Mech.* 17:151–189 (1985).
"Knuckleballs," *Scientific* American, p. 22 (1987).
Breidenthal, Robert E., article on bluff body aerodynamics of sports balls, *Trawl System Cell Design and Methods* (1998).
Diggs, Jesse S., "Hydrodynamic Characterization of Various Towed Array Towcables," Towed Systems Branch, Naval Ship Research and Development Center, Bethesda, Maryland (1974).
Endeco, Inc., "Haired Faired™ Cable," Endeco Towed Systems (date unknown).

(List continued on next page.)

*Primary Examiner*—Peter M. Poon
*Assistant Examiner*—Bethany Griles
(74) *Attorney, Agent, or Firm*—D. E. Schreiber (57) ABSTRACT

Mesh cells (30) for machine-made netting (51) use pairs of mesh bars (35) made from a continuous length of material and meet at a common coupler (34). Such mesh bars (35) have a lay with a common direction throughout the length of material. In a zig-zag pattern used in knitting machine-made netting (31), the longitudinal axis of symmetry (38) of mesh bars (35) turns at each coupler (34). Towing such mesh bars (35) causes water to flow past pairs thereof in two different directions with respect to their common lay. The directions of water flow are neither parallel nor perpendicular to the longitudinal axis of symmetry (38) of the mesh bars (35). As water flows past the mesh bars (35), the cross-sectional shapes of the mesh bars (35) produce a net component of force that is oriented in a direction perpendicular to a combined drag component of force for the mesh bars (35).

22 Claims, 7 Drawing Sheets

U.S. PATENT DOCUMENTS

| | | | |
|---|---|---|---|
| 2,816,386 A | | 12/1957 | Harris et al. |
| 2,823,576 A | | 2/1958 | Needham et al. |
| 3,041,915 A | | 7/1962 | Ryffel |
| 3,102,357 A | | 9/1963 | Luketa |
| 3,131,501 A | | 5/1964 | Luketa |
| 3,153,297 A | | 10/1964 | Grabowsky |
| 3,308,567 A | | 3/1967 | Luketa |
| 3,369,317 A | | 2/1968 | Brownell |
| 3,606,815 A | | 9/1971 | Yamashita et al. |
| 4,303,714 A | * | 12/1981 | Mercer ........................ 428/135 |
| 4,457,959 A | | 7/1984 | Dornheim et al. |
| 4,521,986 A | | 6/1985 | Koga |
| 4,947,727 A | * | 8/1990 | Momoi .......................... 87/12 |
| 5,339,657 A | | 8/1994 | McMurray |
| 5,453,190 A | | 9/1995 | Martin, Sr. |
| 5,509,227 A | * | 4/1996 | Marrero ............................ 43/7 |
| 5,540,064 A | * | 7/1996 | Matsuda et al. ............... 66/193 |
| 5,752,459 A | | 5/1998 | Rexroad |
| RE36,057 E | * | 1/1999 | Martin, Sr. .................. 210/241 |

FOREIGN PATENT DOCUMENTS

| | | |
|---|---|---|
| JP | 60-39782 | 3/1982 |
| JP | 59-71630 | 4/1984 |
| JP | 60-30630 | 2/1985 |
| JP | 60-88160 | 5/1985 |
| JP | 60-139860 | 7/1985 |
| JP | 61-386 | 8/1986 |
| SU | 1444981 | 12/1986 |
| SU | 1480792 A1 | 5/1989 |
| WO | WO 91/01633 | 2/1991 |
| WO | WO 97/13407 | 4/1997 |

OTHER PUBLICATIONS

The Zippertubing Co. product data sheets and bulletins for DVH–20 and DVH–40 cable fairings, specifications, and installation (date unknown).

Flugwiss, Z., Weltraumforsch 14, p. 40 (date unknown).

Breidenthal, R., *Phys. Fluids*, vol. 23, No. 10, p. 1931 (1980).

"On the Persistence of Transition in the Near–Wake," pp. 607 and 609. *Problems of Hydrodynamics and Continum Mechanics, Soc. Industrial and Appl. Math.*, Philadelphia (1969).

Williamson, C.H.K., "Oblique and Parallel Modes of Vortex Shedding in the Wake of a Circular Cylinder at Low Reynolds Numbers," *Journal of Fluid Mechanics* 206:595 and 597, 1989.

Hunt, J.C.R., "Industrial and Environmental Fluid Mechanics," *Annual Review of Fluid Mechanics* 23, pp. 10–12 (1991).

Lisoski graph, Fig. 7, Experimental Lift and Drag histories for bluff plate (thickness=10%), p. 95 (1993).

Roshko, A., "Perspectives on Bluff Body Aerodynamics," *Second International Colloquium on Bluff Body Aerodynamics and Applications*, Melbourne, 7–10, p. 81 (1992).

Cermak, J.E., "Aerodynamics of Buildings," *Annual Review of Mechanics* 8 p. 99 (1976).

Hoerner, S.F., "Fluid–Dynamic Drag," published by author, pp. 3–2 and 4–4 (1965).

Hoerner, S.F., "III—Pressure Drag," published by author, pp. 3–7, 3–9, 3–11, and 3–27 (1965).

Hoerner, S.F., "IV—Structures," published by author, p. 4–5 (1965).

Examples of Spectrum products, specific projects and end–users, Spectrum Ocean Systems Limited, Peterborough, Ontario (date unknown).

"Fairing and Anti–Stacking Ring Assemblies for Tow Cables," Spectrum Ocean Systems Limited, Peterborough, Ontario (date unknown).

Oceanographic Ribbon Fairing Cable, The Rochester Corporation, Cat–82 (date unknown).

Nebres, Jose V., "Wake Similarity and Vortex Formation for Two–Dimensional Bluff Bodies," Doctoral Dissertation, University of Notre Dame, Indiana (1992).

Batill, S.M., et al., "Detailed Near Surface Flow About Yawed, Stranded Cables," Coastal Systems Station, Dehlgren Division, Naval Surface Warfare Center, Panama City, Florida (1992).

Nebres, Jose V., "Flow Around Yawed Stranded Cables," Master's Thesis, University of Notre Dame, Indiana (1989).

Batill, S.M.. et al., "An Experimental Investigation of the Flow Field Around Yawed Stranded Cables," Naval Coastal Systems Center, Panama City, Florida (1989).

* cited by examiner

BI-DIRECTIONAL, MANUFACTURABLE, LIFT-GENERATING MESH BAR

This is a United States national application of International application No. PCT/US99/02820, filed Feb. 10, 1999, the benefit of the filing date of which is hereby claimed under 35 U.S.C. § 120, which in turn claims the benefit of U.S. Provisional Application No. 60/074,220, filed Feb. 10, 1998, and U.S. Provisional Application No. 60/084,103, filed May 4, 1998, the benefit of the filing dates of which are hereby claimed under 35 U.S.C. § 119.

TECHNICAL FIELD

The present invention relates generally to the technical field of hydrodynamics and, more particularly, a lift generating shape used for a trawl system component.

BACKGROUND ART

Figure 1:
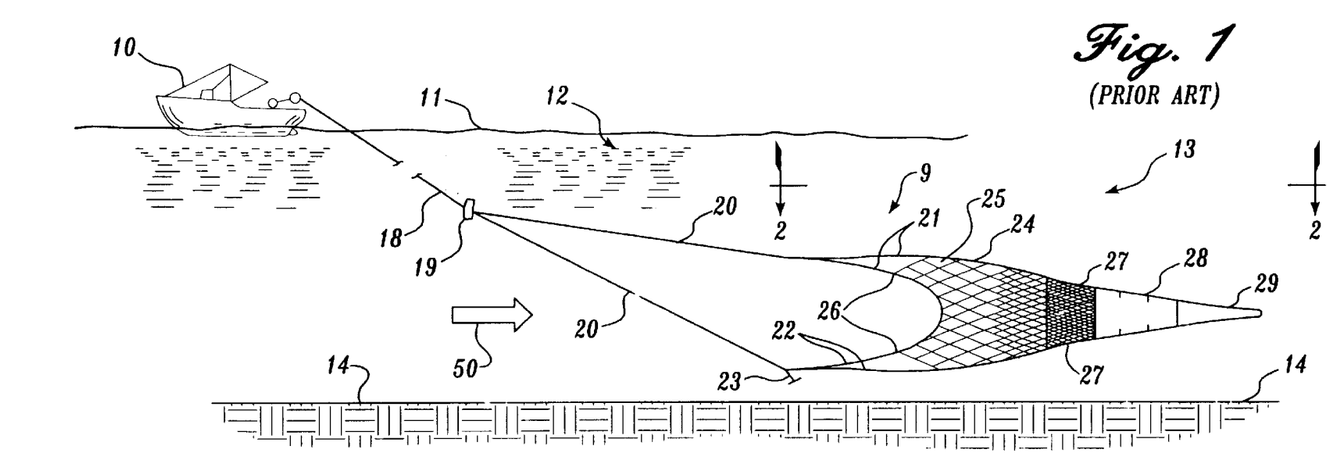
FIG. 1 is an elevational view illustrating a prior art mid-water trawl system, such as that disclosed in the First PCT patent application, that includes a trawl being towed by a vessel.

Published Patent Cooperation Treaty ("PCT") International Patent Application, International Publication Number WO 97/13407, International Publication Date Apr. 17, 1997, entitled "Trawl System Cell Design and Methods" ("the First PCT patent application") describes a trawl system that uses corkscrew shaped mesh bars to improve the shape and performance of the trawl system. As set forth in the First PCT patent application, FIG. 1 depicts a towing vessel 10 at a surface 11 of a body of water 12 that is towing a mid-water trawl 13 of a trawl system 9. The trawl 13 is positioned between the surface 11 and an ocean bottom 14. The trawl 13 can be connected to the towing vessel 10 in many ways, such as by a main towing line 18 connected through doors 19, towing bridles 20 and mini-bridles 21, 22. A series of weights 23 is attached to mini-bridle 22. Likewise, the shape and pattern of the trawl 13 can vary as is well known in the art. As shown, the trawl 13 has a forward section 24 that includes forward projecting wings 25 for better herding at mouth 26. The forward section 24, including wings 25, is seen to define a mesh size that is larger than that used for a mid-section 27, back-end 28, or codend 29 of the trawl 13.

Figure 2:
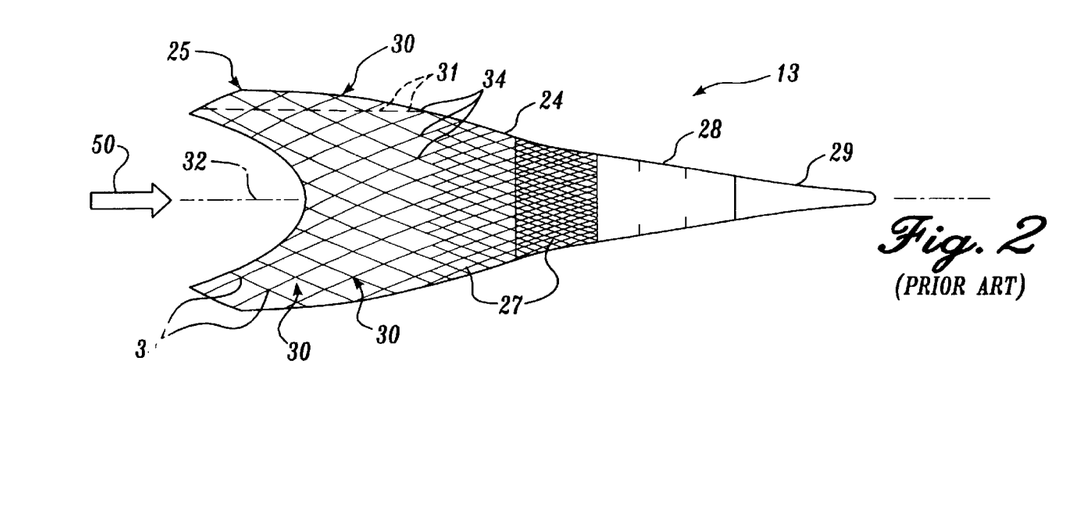
FIG. 2 is a more detailed, plan view illustrating the prior art trawl of FIG. 1 that depicts some of the mesh cells included in the trawl.

FIG. 2 illustrates the wing 25 of the trawl 13 of FIG. 1 in more detail and includes a series of mesh cells 30 of quadratic cross-section that are part of panel 31 and are offset from axis of symmetry 32 of the trawl 13. The size of mesh cells 30 is determined by a distance between adjacent knots or equivalent couplers 34. Different sections of the trawl 13, and even different regions within a section, use different size mesh cells 30, which generally form a repeating pattern within that section or region of a section.

Figure 3:
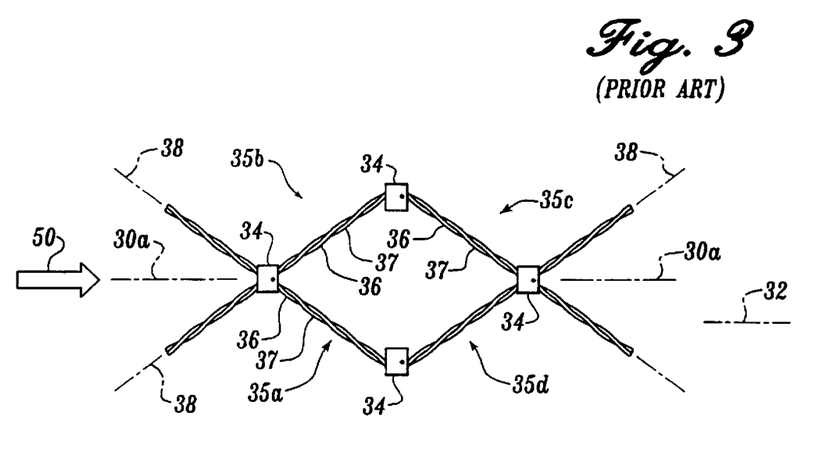
FIG. 3 is a plan view illustrating a prior art mesh cell included in the trawl depicted in FIGS. 1 and 2.

As shown in FIG. 3, the mesh cells 30 each have a longitudinal axis of symmetry 30a, and are formed by mesh bars 35a, 35b, 35c and 35d each of which includes several product strands 36, 37. The product strands 36, 37 may be twisted about a longitudinal axis of symmetry 38 in either one of two lay directions: right-hand or left-hand as viewed axially along longitudinal axis of symmetry 38 and in a receding direction established upstream of the trawl 13 thereby establishing the cork-screw shape disclosed in the First PCT patent application.

As disclosed in the First PCT patent application, the mesh bars 35 may be formed either by product strands 36, 37 as depicted in FIG. 3, or by straps which are not illustrated in any of the FIGs. Published PCT International Patent Application, International Publication Number WO 98/46070, International Publication Date Oct. 23, 1998, entitled "Improved Cell Design for a Trawl System and Methods" ("the Second PCT patent application") further discloses that the product strands 36, 37 of the mesh bars 35 are preferably formed from a substantially incompressible material. Both the First and the Second PCT patent applications are hereby incorporated by reference.

As the towing vessel 10 draws the trawl system 9 through the body of water 12 along a straight-line course, water flows through the trawl 13 substantially parallel to an arrow 50, illustrated in FIGS. 1 and 2, which is oriented parallel to the axis of symmetry 32. However, it is to be noted that as illustrated in FIG. 3 the direction in which water flows through individual mesh cells 30 of the trawl 13 is not, in general, parallel to the axis of symmetry 30a. It should also be noted that hydrodynamically the mesh bars 35 both of conventional trawl systems 9 and of trawl systems 9 assembled in accordance with the First and Second PCT patent applications are properly characterized as "bluff body" shapes. This is to be contrasted with another class of shapes, such as airplane wings, which hydrodynamicists characterized as being "streamline" shapes.

For conventional trawl systems and trawls not assembled in accordance with the disclosure set forth in the First PCT patent application, drag forces caused by movement of the trawl system through the water entrained environment tends to draw the mesh cells 30 of the trawl 13 closer to the axis of symmetry 32 thereby closing the trawl 13. Appropriately orienting the cork-screw shape of the mesh bars 35 in accordance with the description set forth in the First PCT patent application as depicted in FIG. 3 yields a trawl system 9 in which movement of mesh bars 35 through the water entrained environment generates a force on each mesh bar 35 which has a component that is directed at a right angle from the drag force component, and away from the axis of symmetry 32. The effect of the force components generated by such movement of the individual mesh bars 35 that are oriented at a right angle from the drag force component is to make the trawl system 9, particularly the trawl 13, "self-spreading" thereby expanding the trawl 13 away from the axis of symmetry 32.

As set forth above, the size of mesh cells 30 is determined by the length of the mesh bars 35 between adjacent knots or equivalent couplers 34. As indicated in FIGS. 1 and 2, the size of the mesh cells 30, and correspondingly the length of mesh bars 35, varies along the length of the trawl 13. For example, the mesh bars 35 in the forward section 24 have a length of at least 10 ft (304.8 cm). Alternatively, the mesh bars 35 in the mid-section 27 of the trawl 13 have length between 10 ft. (304.8 cm) and 0.75 ft (22.86 cm). The mesh bars 35 of the back-end 28 have a length less than 0.75 ft (22.86 cm). While manual assembly of mesh cells 30 of the forward section 24 is commercially practical, as the mesh bars 35 become ever shorter toward the codend 29 manual assembly becomes progressively more costly, and therefore less and less commercially viable. Consequently, to reduce the cost of trawls 13 the general practice is to incorporate netting woven by machines into the "back-end" of trawls 13 such as in the codend 29, in the back-end 28, and even perhaps in some instances in the mid-section 27.

Figure 4:
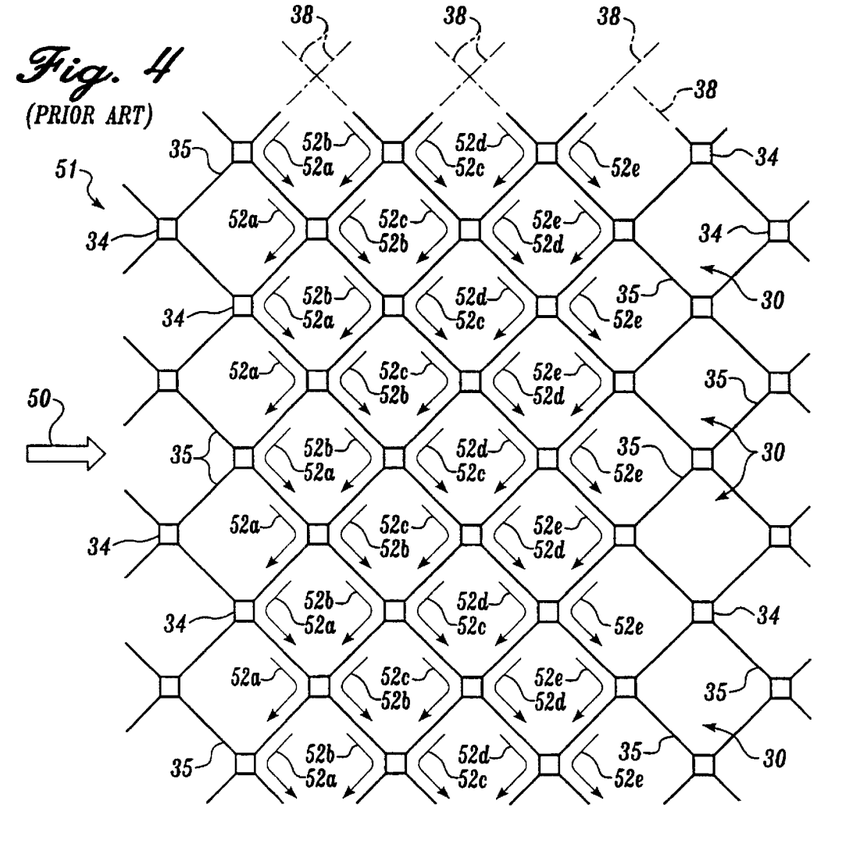
FIG. 4 is a plan diagram illustrating a pattern used in knitting conventional prior art machine-made netting adapted for inclusion into conventional trawls.

FIG. 4 illustrates a pattern used in knitting prior art, machine-made netting 51 of a type used for the "back-end" of conventional trawls. The knitting process for machine-made netting 51 may be understood as progressing row-by-row, from top to bottom in the illustration of FIG. 4. Knitting of machine-made netting 51 proceeds basically at approximately a right angle to the ultimate direction of water flow past the trawl 13, indicated by the arrow 50, after the machine-made netting 51 has been incorporated into a trawl 13, and the trawl system 9 is being towed through a water entrained environment.

In knitting conventional machine-made netting 51 a number of individual spools, perhaps as many as 100, concurrently feed product strands in parallel while the net knitting machine knots or braids pairs of them together at the couplers 34 alternating back-and-forth horizontally to establish a zig-zag path for the product strands 36. Thus a vertical column of L-shaped arrows 52a in FIG. 4 indicate the zig-zag path along which a single product strand, the longitudinal axis of symmetry 38 of which turns at each coupler 34, crosses the machine-made netting 51 from top to bottom of FIG. 4. Similarly a vertical column of L-shaped arrows 52b in FIG. 4, immediately to the right of the L-shaped arrows 52a, indicate the zig-zag path along which an immediately adjacent product strand crosses the machine-made netting 51 from top to bottom. In the illustration of FIG. 4, three additional vertical columns of L-shaped arrows 52c, 52d and 52e, to the right of the columns of L-shaped arrows 52a and 52b in FIG. 4, indicate paths along which yet other product strands cross the machine-made netting 51 from top to bottom in FIG. 4. In conventional machine-made netting 51, machine tied knots or braided intersections usually provide the couplers 34 which fasten ends of mesh bars 35 together in forming the mesh cells 30.

If one attempts to produce machine-made netting 51 in the conventional way described above using spools of corkscrewed product strands 36, 37 for the mesh bars 35, one could not obtain the proper lays for the mesh bars 35 that are depicted in FIG. 3. For example, one could arrange a spool of corkscrewed product strands 36, 37 to obtain the proper lay for the mesh bar 35b in FIG. 3, but then the lay of the mesh bar 35a could not reverse direction at their common coupler 34, and therefore mesh bar 35a would have a lay opposite to that depicted in FIG. 3. Similarly, one could arrange a spool of corkscrewed product strands 36, 37 to obtain the proper lay for the mesh bar 35c, but then the lay of the mesh bar 35d would be opposite to that depicted in FIG. 3.

Such machine-made lays for corkscrew shaped mesh bars 35 would yield some of the advantages disclosed in the First PCT patent application, i.e. lower drag, less vibration and lower noise. However, such machine-made lays would not produce a self-spreading codend 29, back-end 28 or mid-section 27. Rather substantially equal strength components of force oriented perpendicular to the axis of symmetry 32 for such alternating lay, machine-made mesh bars 35 would be directed away from the axis of symmetry 32 for the mesh bars 35b and 35c, but would be directed toward the axis of symmetry 32 for the mesh bars 35a and 35d. Reversing the direction of water flow past the mesh bars 35 from that indicated by the arrow 50 in FIGS. 3 and 4 merely reverses the direction of the component of force perpendicular to the axis of symmetry 32 for the mesh bars 35. Such oppositely directed components of substantially equal strength forces perpendicular to the axis of symmetry 32 merely cancel each other so movement of the mesh bars 35 through the water entrained environment yields no net force directed away from or toward the axis of symmetry 32 for machine-made mesh cells 30 formed by either product strand or strap mesh bars 35 having cross-sectional shapes such as those disclosed in the First PCT patent application.

DEFINITIONS

BRIDLES are lines that intersect the frontropes and attach to the tow lines. For a particular port or starboard tow line, a pair of bridles extend from a common connection point therewith, back to the frontropes.

CODEND is a portion of a trawl positioned at the trailing end thereof and comprises a closed sac-like terminus in which the gathered marine life including fish are trapped.

FRAME is a portion of the larger sized meshes of a net or trawl upon which is overlaid (and attached by a binding) a netting of conventional twist.

LAY is the direction in which the strands wind when viewed axially and in a receding direction.

NET is a meshed arrangement of product strands that have been woven or knotted or otherwise coupled together usually at regular intervals or at intervals that vary usually uniformly along the length of the trawl.

MESH BAR is one side of a mesh cell and is composed of synthetic or natural fibers which, in accordance with the present invention, exhibit hydrofoil-like characteristics during field operation.

MESH CELL means the sides of a mesh and includes at least three sides and associated knots or equivalent couplers oriented in space. A quadratic mesh cell has four sides with four knots or couplers, and is usually arranged to form a parallelogram (including rectangular and square), with diamond-shaped mesh (trawl mesh) being preferred. A triangular mesh cell has three sides and three knots or couplers. A hexagonal mesh cell has six sides and six knots or couplers.

PANEL is one of the sections of a trawl and is made to fit generally within and about frames shaped by riblines offset from the longitudinal axis of symmetry of the trawl.

PITCH is the amount of advance in one turn of one strand twisted about another strand (or strands) when viewed axially.

PRODUCT STRAND includes the synthetic or natural fibers or filaments used to form the construction unit of the invention which is preferably but not necessarily the product of a conventional manufacturing process, usually made of nylon, polyethylene, cotton or the like twisted in common lay direction. Such strand can be twisted, plaited, braided or laid parallel to form a sub-unit for further twisting or other use within a mesh bar in accordance with the invention.

STRAND UNIT means a group of strands used to achieve ascending or descending order where such order repeats along a mesh bar.

TRAWL is a large net generally in the shape of a truncated cone trailed through a water column or dragged along a sea bottom to gather marine life including fish.

TRAWL SYSTEM includes the trawl, net or the like in association with the towlines therefor as well as the frontropes, bridles lines, and means to keep its mouth open.

DISCLOSURE OF INVENTION

An object of the present invention is to provide economically practical self-spreading net for use in the codend 29, back-end 28, and mid-section 27 of trawls 13.

Another object of the present invention is to provide machine-made net that is self-spreading.

Another object of the present invention is to provide mesh bars 35 for a trawl 13 which produce a component of force directed in a single, pre-established direction perpendicular to a drag component of force for the mesh bars 35 if water flows past the mesh bars 35 in different directions with respect to the lay of the mesh bars 35.

Briefly, employing the present invention the machine-made portions of a self-spreading trawl 13 may be assembled using pairs of mesh bars 35 which meet at a common coupler 34, and are made from a continuous length of material having:

1. a lay with a common direction throughout the length of material;

2. a cross-sectional shape; and 3. a longitudinal axis of symmetry.

In establishing the zig-zag pattern used in knitting machine-made netting 51, the longitudinal axis of symmetry 38 of such pairs of mesh bars 35 turns at each coupler 34. During field operations, for machine-made portions included in a trawl 13 upon being towed through a water entrained environment:

1. water respectively flows past pairs of mesh bars 35 in accordance with the present invention in two different directions with respect to the common lay thereof;
2. the directions in which water flows past the product strands 36 is neither parallel nor perpendicular to the longitudinal axis of symmetry 38 of the mesh bars 35; and
3. as water flows past the mesh bars 35, the cross-sectional shapes of the mesh bars 35 produce a net component of force that is oriented in a direction perpendicular to a combined drag component of force for the mesh bars 35.

These and other features, objects and advantages will be understood or apparent to those of ordinary skill in the art from the following detailed description of the preferred embodiment as illustrated in the various drawing figures.

BEST MODE FOR CARRYING OUT THE INVENTION

Figure 5:
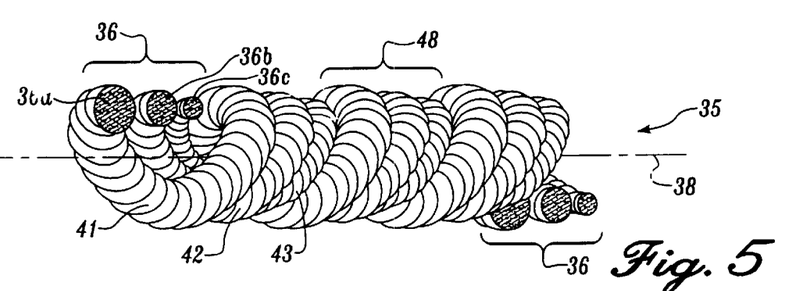
FIG. 5 is an elevational view (not to scale) illustrating a portion of a mesh bar in accordance with the present invention having a cross-sectional shape which provides hydrofoil-like characteristics.
Figure 6:
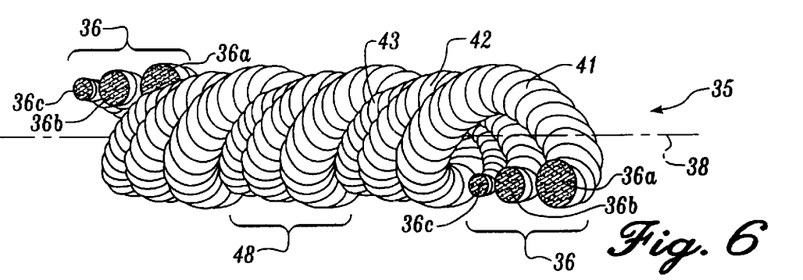
FIG. 6 is an elevational view (not to scale) illustrating a portion of an alternative mesh bar in accordance with the present invention having a cross-sectional shape which provides hydrofoil-like characteristics, but having a lay that is opposite to the lay depicted in FIG. 5.

FIGS. 5 and 6 respectively illustrate a preferred embodiment for mesh bars 35 in accordance with the present invention. In the configuration of the preferred embodiment of the present invention depicted in FIGS. 5 and 6 mesh bars 35 include two or preferably three product strands 36 spiraling symmetrically about the longitudinal axis of symmetry 38. In another configuration of the preferred embodiment the mesh bars 35 can comprise two or three product strands 36 twisted asymmetrically along the longitudinal axis of symmetry 38. The product strands 36 spiral or twist about the longitudinal axis of symmetry 38 in a common lay direction which can be either clockwise or counterclockwise as viewed axially along the longitudinal axis of symmetry 38 and in a receding direction from a point upstream of the trawl 13.

As illustrated in FIGS. 5 and 6, the product strands 36 of each mesh bar 35 differ in diameter to establish either an ascending or a descending size progression. Thus product strand 36a is larger than product strand 36b which in turn is larger than product strand 36c. The product strands 36a, 36b and 36c together form a strand unit 48 which repeats over and over again along the longitudinal axis of symmetry 38 with one paramount attribute: a common ascending or descending size progression relative to lead coupler 34a depicted in FIG. 7. Repetition of the strand unit 48 continues from the lead coupler 34a to intermediate couplers 34b and 34c, and thence to trailing coupler 34d.

In machine-knitting netting 51 in accordance with the present invention, either one or the other of the two lay directions respectively illustrated in FIGS. 5 and 6 is selected for all mesh bars 35 throughout the machine woven netting 51. Each individual mesh cell 30 includes the lead coupler 34a from which mesh bars 35a and 35b project respectively to intermediate couplers 34b and 34c. The mesh bars 35a and 35b respectively terminate at intermediate couplers 34b and 34c from which respectively project mesh bars 35c and 35d that terminate at trailing coupler 34d. The mesh cell 30, including the mesh bars 35a, 35b, 35c and 35d all having the same lay, repeats throughout the machine-made netting 51. Furthermore, for machine-made netting 51 the mesh bars 35a, 35b, 35c and 35d are all of equal length. Consequently, regardless of the angle existing between any pair of mesh bars 35 sharing a common coupler 34, the mesh bars 35 always constitute at least sides of a parallelogram.

Figure 7:
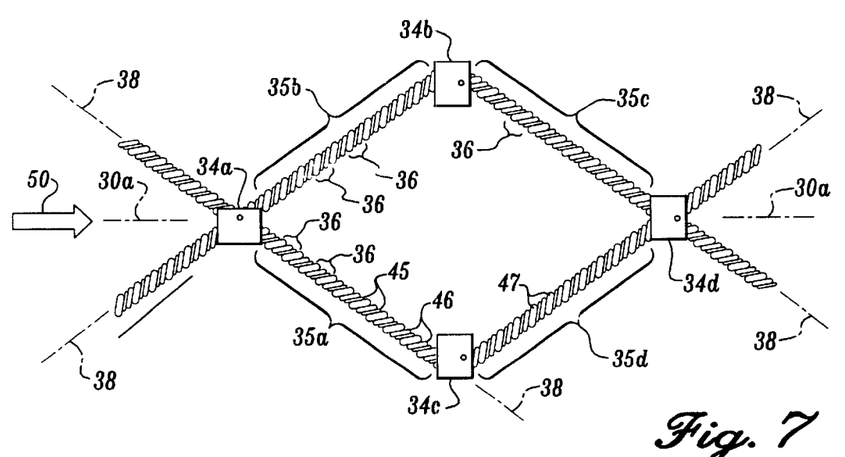
FIG. 7 is a plan view illustrating mesh bars in accordance with the present invention, such as those illustrated in FIGS. 5 and 6, assembled to form a mesh cell adapted for inclusion into the trawl depicted in FIGS. 1 and 2.

In the illustration of FIG. 7, the shape and orientation of mesh bar 35a matches that of mesh bar 35c, but has an size progression opposite to that of mesh bars 35b and 35d. Analogously, the shape and orientation of mesh bar 35b matches that of mesh bar 35d, but has an size progression opposite to that of mesh bars 35a and 35c.

The pitch selected for mesh bars 35 in accordance with the present invention depends upon design criteria established for the netting 51. For example, a tight pitch, such as that depicted in FIGS. 5 and 6, for the lay of mesh bars 35 facilitates machine knitting of the netting 51. Conversely, a looser pitch for mesh bars 35 made in accordance with the present invention reduces drag and vibration of the netting 51 when towed through a water entrained environment.

As depicted in FIGS. 5 and 6, the product strand 36a has an outer surface 41, product strand 36b has an outer surfaces 42, and product strand 36c has an outer surface 43. Note that outer surfaces 41, 42 of the product strands 36a, 36b are in tangential contact along a single contact, spiraling curve 45, illustrated in FIG. 7, that spirals symmetrical about the longitudinal axis of symmetry 38. Similarly, tangential contact occurs for the other product strand pairs 36b, 36c, and 36c, 36a occur along spiraling curves 46, 47 that also spiral symmetrical about longitudinal axis of symmetry 38.

Consider now any pair of mesh bars 35 depicted in FIG. 7 that meet at a coupler 34, i.e. the mesh bars 35a and 35b and the coupler 34a, the mesh bars 35b and 35c and the coupler 34b, the mesh bars 35c and 35d and the coupler 34d, and the mesh bars 35a and 35d and the coupler 34c. When towed through a water entrained environment, water flows past both mesh bars 35 in any such pair in a direction, indicated by the arrow 50, that is neither parallel nor perpendicular to the longitudinal axis of symmetry 38 of the mesh bars 35. Furthermore, because as stated above the mesh bars 35 constitutes sides of a parallelogram, with respect to the lays for any such pair of mesh bars 35 which meet at a coupler 34, e.g. mesh bars 35a and 35b, water flows past one of the mesh bars 35, e.g. mesh bar 35b, in a direction with respect to the lay of that mesh bar 35 which is orthogonal to the direction of the lay of the other mesh bar 35 of the pair, e.g. mesh bar 35b. This is to be contrasted with the prior art mesh bars 35 depicted in FIG. 3 for which the lays are oriented so water flows past all mesh bars 35 in the same direction.

Thus, netting 51 in accordance with the present invention includes a series of mesh bars 35 that are formed by a continuous length of material having a lay with the same, common direction throughout its entire length. Each successive pair of mesh bars 35 meet at a coupler 34, which usually will be either a knot in or a braided intersection of product strands 36, at which the longitudinal axis of symmetry 38 of the continuous length of material turns. During field operations in which the trawl is towed through a water entrained environment, water respectively flows past the common lay of each pair of mesh bars 35a and 35b, or mesh bars 35c and 35d, joined at a coupler 34 in two different directions with respect to the continuous length of material. The directions in which water flows past the pair of mesh bars 35, indicated by the arrow 50, is neither parallel nor perpendicular to the longitudinal axis of symmetry 38 of the mesh bars 35. However, even though water flows past the mesh bar 35 of each pair that meet at a coupler 34 in different directions with respect to the lay of the mesh bars 35, both mesh bars 35 of the pair having the cross-sectional shape depicted either in FIG. 5 or in FIG. 6 exhibit a component of force that is oriented in a single, pre-established direction perpendicular to a drag component of force for the mesh bars 35. Consequently, rather than the canceling of equal strength forces as would occur for mesh bars 35 disclosed in the First and the Second PCT patent applications, the cross-sectional shapes of mesh bars 35 in accordance with the present invention produce a net component of force that is oriented in a direction perpendicular to a combined drag component of force for the mesh bars 35 even though their lay does not reverse direction at couplers 34.

For reasons explained in greater detail below, the spiraled or twisted cross-sectional shape for the mesh bars 35 depicted in FIGS. 5 and 6, yields machine-made mesh cells 30 having mini-hydrofoil mesh bars 35 which, when towed through a water entrained environment, generate a force for all the mesh bars 35 that may be chosen to be directed either away from or toward the axis of symmetry 32 of the trawl 13. Configured in this way, a lift coefficient Cn of the mini-hydrofoil sections provided by the quasi-triangular descending or ascending progression of the product strands 36a, 36b and 36c differs in magnitude but not in direction depending upon the orientation of cross-sectional shape with respect to the direction in which water flows past mesh bars 35. That is, Cn for the mesh bar 35a of FIG. 7, has a magnitude about twice that of mesh bar 35b assuming that water flows past the mesh bars 35a and 35b parallel to the arrow 50. Likewise, Cn for the mesh bar 35c is about twice that of mesh bar 35d assuming again that water flows past the mesh bars 35a and 35b parallel to the arrow 50.

Consequently, individual components of force generated by the mesh bars 35a, 35b, 35c and 35d in accordance with the present invention for each machine-made mesh cell 30 that are oriented perpendicular to the axis of symmetry 32 do not cancel. Rather the individual components of force generated by such mesh bars 35a, 35b, 35c and 35d add together to produce a composite lift vector for each mesh cell 30 that is not zero, but rather is directed either away from or toward the axis of symmetry 32. A proper orientation of the mesh cells 30 which directs the composite lift vector for each mesh cell 30 away from the axis of symmetry 32 increases significantly the volume of the trawl 13 while simultaneously retaining the reduced drag, vibration and noise obtained by using mesh bars 35 in accordance with the disclosure of the First PCT patent application.

Figure 8:
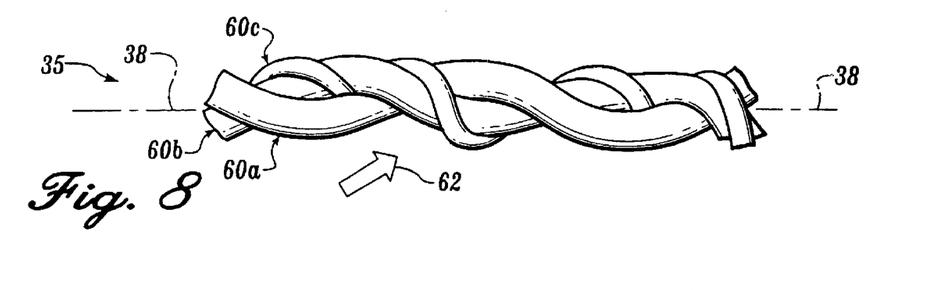
FIG. 8 is an elevational view (not to scale) illustrating a portion of a an alternative mesh bar in accordance with the present invention.
Figure 9:
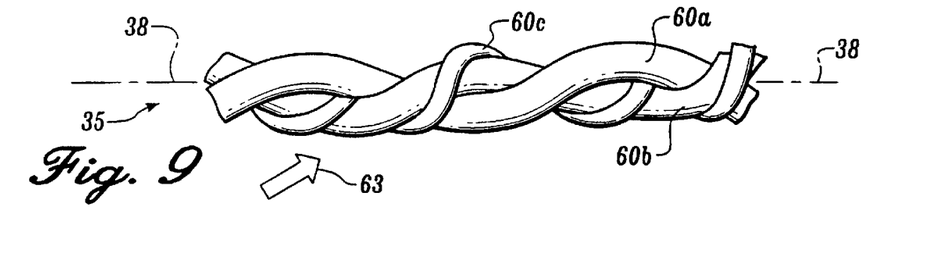
FIG. 9 is an elevational view (not to scale) illustrating a portion of an alternative mesh bar in accordance with the present invention that has a lay which is opposite to the lay depicted in FIG. 8.

FIGS. 8 and 9 show mesh bars 35 in accordance with the present invention in which the product strands have a placement relative to each other which differs from that depicted in FIGS. 5 and 6. As illustrated, product strands 60a, 60b and 60c serpentine asymmetrically about the longitudinal axis of symmetry 38 but still provide an ascending or descending size progression depending upon direction in which water flows past the mesh bars 35, in the direction indicated by arrow 62, or in the direction indicated by arrow 63.

Industrial Applicability

Figure 10:
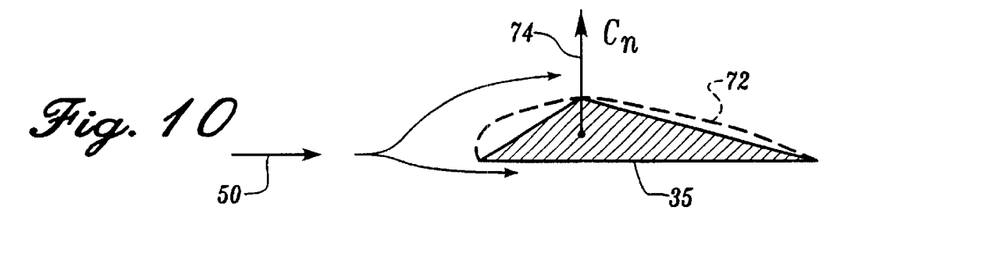
FIG. 10 is a cross-sectional elevational view illustrating a lift coefficient cn resulting from fluid flow about a triangularly shaped mesh bar.
Figure 12:
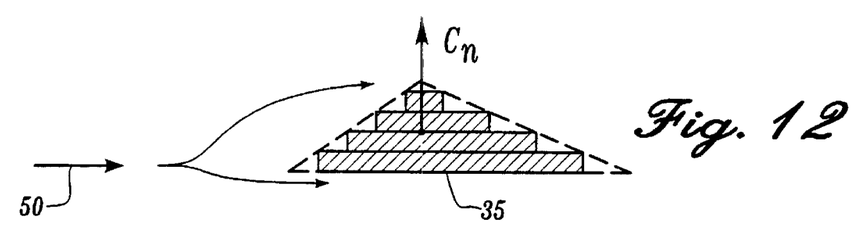
FIG. 12 is a cross-sectional elevational view illustrating an alternative embodiment triangularly shaped mesh bar in accordance with the present invention assembled by stacking straps of differing widths.
Figure 13:
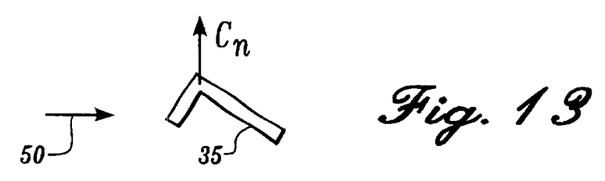
FIG. 13 is a cross-sectional elevational view illustrating yet another alternative embodiment L-shaped mesh bar in accordance with the present invention.
Figure 14A:
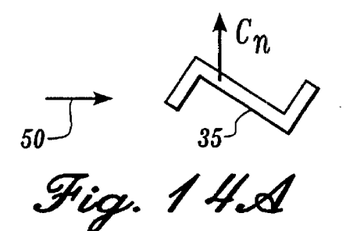
FIGS. 14a and 14b are cross-sectional elevational view illustrating yet another alternative embodiment Z-shaped mesh bar in accordance with the present invention.
Figure 14B:
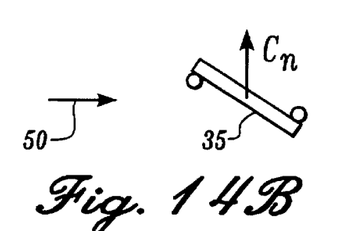
Figure 15:
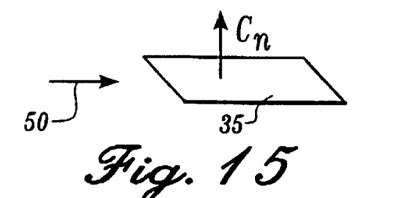
FIG. 15 is a cross-sectional elevational view illustrating an alternative embodiment parallelogram shaped mesh bar in accordance with the present invention.
Figure 16:
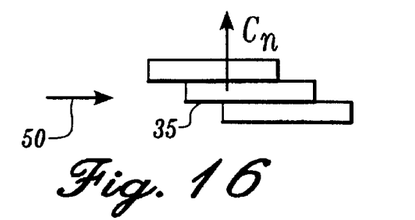
FIG. 16 is a cross-sectional elevational view illustrating an alternative embodiment quasi-parallelogram shaped mesh bar in accordance with the present invention assembled by stacking straps of the same width.

Properly orienting a mesh bar 35 having a specific nonequilateral, quasi-triangular cross-sectional shape illustrated in FIG. 10 to water flow past the mesh bar 35 approximates a hydrofoil shape indicated by dashed curve 72. In the illustration of FIG. 10, an arrow 74 indicates for the mesh bar 35 having the illustrated quasi-triangular cross-sectional shape a lift coefficient Cn that is oriented at a right angle to the drag component of force for the mesh bar 35. FIG. 12 illustrates how a quasi-triangular cross-sectional shape for the mesh bar 35, similar to that illustrated in FIG. 10, may be assembled by stacking straps of differing widths.

Figure 11:
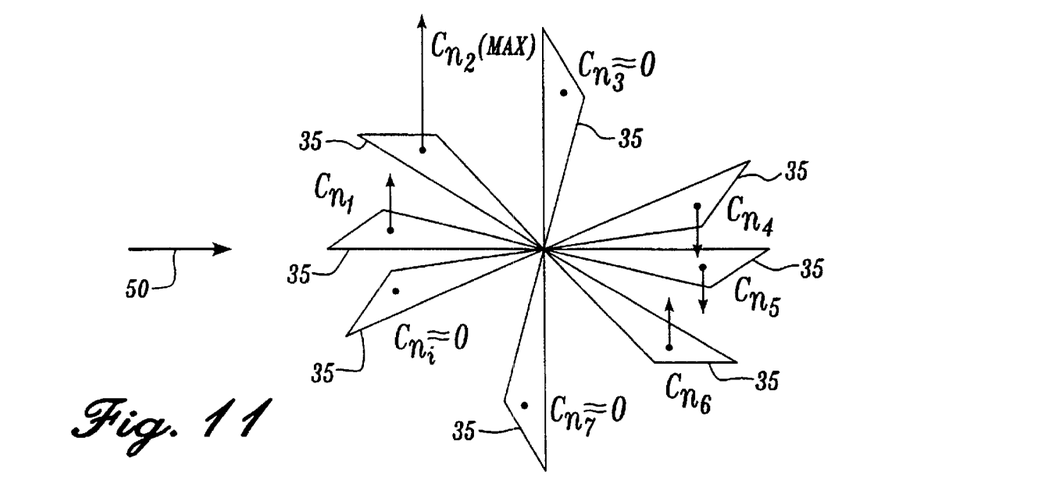
FIG. 11 is a cross-sectional elevational view illustrating lift coefficients $Cn_i$ resulting from fluid flow about a triangularly shaped mesh bar oriented at various angles of attack with respect to fluid flow.

FIG. 11 depicts various lift coefficients $Cn_1$, $Cn_2$, ... $Cn_i$ that can be measured for the quasi-triangular cross-sectional shape of FIG. 10 for a sequence of differing angles of attack with respect to the direction of water flow indicated by the arrow 50. While some angles of attack for the mesh bar 35 produce a positive lift coefficient Cn, others produce a zero lift coefficient Cn, while yet other angles of attack actually produce a negative lift coefficient Cn. However, a sum of the lift coefficients $Cn_i$ for all possible angles of attack for the quasi-triangular cross-sectional shaped mesh bar 35 is not zero, but has a finite value. Since spiraling or twisting of the mesh bar 35 about the longitudinal axis of symmetry 38 mechanically effects a summing of the lift coefficients $Cn_i$ for all possible angles of attack for the quasi-triangular cross-sectional shape mesh bars 35 as water flows past the mesh bar 35, the mesh bar 35 exhibits a net force that is oriented in a direction perpendicular to the drag force component. Considering the pair of mesh bars 35b and 35c depicted in FIG. 7, or equivalently the pair of mesh bars 35a and 35d, spiraling or twisting of the strand unit 48 about the longitudinal axis of symmetry 38 mechanically effects a summing of individual forces on the mesh bars 35 that are oriented perpendicular to the drag force component on the mesh bar 35 for all possible angles of attack when water flows past the mesh bars 35.

Figure 17:
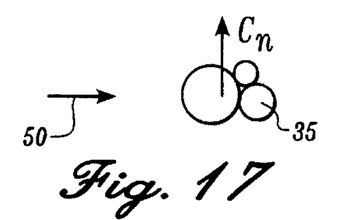
FIG. 17 is a cross-sectional elevational view illustrating an alternative embodiment triangularly shaped mesh bar in accordance with the present invention assembled in which three product strands of differing in diameter are configured so each of the product strands contacts the two remaining product strands.

While the mesh bars 35 depicted in FIGS. 4, 5, 8, 9, 10 and 11 have cross-sectional shape that exhibits hydrofoil-like characteristics in accordance with the present invention, there exist other cross-sectional shapes for pairs of mesh bars 35 such as the pairs mesh bars 35b and 35c or mesh bars 35a and 35d that also exhibit a net force oriented in a direction perpendicular to the drag force component. FIGS. 13 through 17 depict a variety of alternative, asymmetric cross-sectional shapes which also exhibit that property. Thus pairs of mesh bars 35b and 35c or mesh bars 35a and 35d having a L-shaped cross-sectional shape depicted in FIG. 13, when twisted about the longitudinal axis of symmetry 38, exhibit a hydrofoil-like characteristic to independently produce forces that are oriented parallel to each other, and oriented at a right angle to the drag component of force for the mesh bars 35. Similarly, pairs of mesh bars 35b and 35c or mesh bars 35a and 35d having a Z-shaped cross-sectional shape such as either of those depicted in FIGS. 14a and 14b, when twisted about the longitudinal axis of symmetry 38, exhibit a hydrofoil-like characteristic to independently produce forces that are oriented parallel to each other, and oriented at a right angle to the drag component of force for the mesh bars 35. Pairs of mesh bars 35b and 35c or mesh bars 35a and 35d having either the parallelogram cross-sectional shape depicted in FIG. 15 or the quasi-parallelogram shape depicted in FIG. 16 exhibit a hydrofoil-like characteristic respectively to produce forces that are oriented parallel to each other, and oriented at a right angle to the drag component of force for the mesh bars 35. Lastly, FIG. 17 illustrates a mesh bar 35 having a triangular cross-sectional shape assembled from three product strands of differing diameters. As contrasted with the mesh bars 35 depicted in FIGS. 5–7, the three product strands depicted in FIG. 17 are configured so every one of them contacts the two other product strands. However similar to the mesh bars 35 depicted in FIGS. 5–7, pairs of mesh bars 35a and 35b, or mesh bars 35c and 35d, having the cross-sectional shape depicted in FIG. 17 also produces forces that are oriented parallel to each other, and oriented at a right angle to the drag component of force for the mesh bars 35.

Depending upon precise details of orientation with respect to water flowing past the mesh cells 30 when towed through a water entrained environment, mesh bars 35 made from product strands 36 having any of the asymmetric cross-sectional shapes depicted in FIGS. 12–17 may be configured to exhibit a force having a component perpendicular to the axis of symmetry 32. Details of the orientation with respect to water flowing past the mesh cells 30 for specific configurations determines whether that perpendicular force component is directed toward or away from the axis of symmetry 32. Mesh bars 35 made from product strands 36 having any of the cross-sectional shapes depicted in FIGS. 12–17 may be configured to produce a perpendicular force component regardless of whether the cross-sectional shape of the product strands 36 twists or does not twist along the longitudinal axis of symmetry 38. Mesh bars 35 made from product strands 36 having any of the cross-sectional shapes depicted in FIGS. 12–17 that do not twist along the longitudinal axis of symmetry 38 exhibit lower drag and less vibration than mesh bars 35 of conventional trawl systems 9. Mesh bars 35 made from product strands 36 having any of the cross-sectional shapes depicted in FIGS. 12–17 that twist along the longitudinal axis of symmetry 38 exhibit even a lesser drag and lower vibration than mesh bars 35 in which the cross-sectional shape does not twist along the longitudinal axis of symmetry 38.

It should be pointed out that the product strands 36a, 36b and 36c and 60a, 60b, and 60c are preferably synthetic or natural fibers or filaments used to form the construction unit which are preferably but not necessarily the product of a conventional manufacturing process, usually made of nylon, polyethylene, cotton or the like twisted in common lay direction. Such product strands can be twisted, plaited, braided or laid parallel to form a sub-unit for further twisting or other use within a mesh bar in accordance with the teachings of the invention. In this regard, a heat set and bonded product strand is preferred. Also regardless of which of the configurations of three or more product strands 36 or product strands 60 is chosen for mesh bars 35, maintaining the cross-sectional shape which provides hydrofoil-like characteristics usually requires that adjacent product strands 36 be fixed to each other so the product strands 36 or product strands 60 cannot move relative to each other when force is applied to the mesh bars 35 upon deploying the trawl 13 in a water entrained environment.

Figure 18:
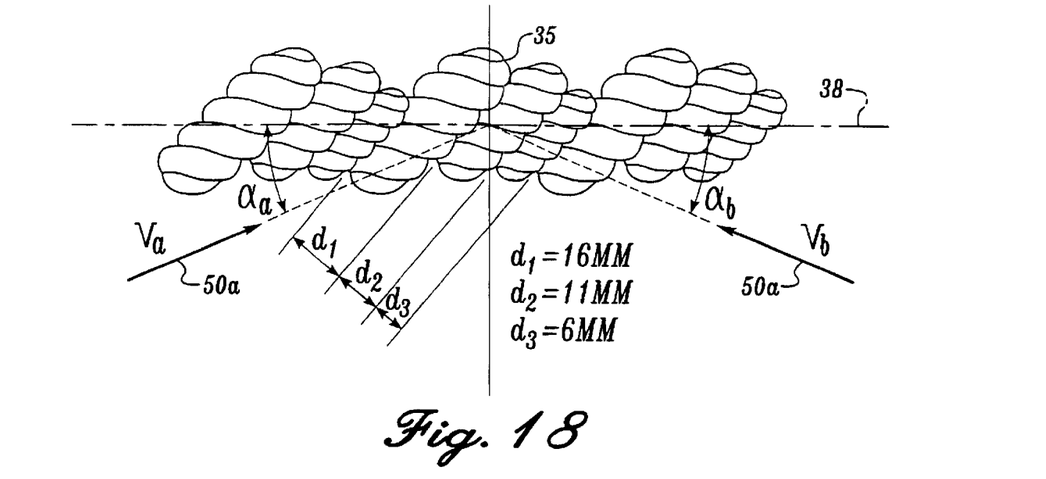
FIG. 18 is a plan diagram (not to scale) illustrating a portion of the mesh bars in accordance with the present invention that are depicted in FIGS. 5–7 which also illustrates two different directions of water flow past such mesh bar.

FIG. 18 depicts a portion of a mesh bar 35 in accordance with the present invention having the structure illustrated in FIGS. 5–7. Regarding assembly of mesh bars 35 in accordance with the present invention that employ this particular style of cross-sectional shape, as indicated in the illustration of FIG. 18 it is significant that the product strands 36 and the mesh bar 35 be arranged so the product strands 36 have an internal lay which is opposite to the lay of the mesh bar 35. The illustration of FIG. 18 also depicts two differing directions of water flow, $V_a$ coming from the left-hand side of the FIG. and $V_b$ coming from the right-hand side of the FIG, past the mesh bar as indicated respectively by arrows 50a and 50b. In the illustration of FIG. 18, a symbol $\alpha_a$ represents an angle between the direction of water flow $V_a$ and the longitudinal axis of symmetry 38 for the mesh bar 35. Similarly, a symbol $\alpha_b$ represents an angle between the longitudinal axis of symmetry 38 for the mesh bar 35 and the second direction of water flow $V_b$. FIG. 18 also specifies values for the three different diameters for the product strands 36 that are twisted to form the mesh bar 35. The following table summarizes drag coefficients, $Cx_a$ and $Cx_b$ which lie in the plane of the FIG., and lift coefficients, $Cn_a$ and $Cn_b$ which are oriented perpendicular to the plane of the FIG., measured experimentally for the mesh bar 35 depicted in FIG. 18 for two different values for each of the angles $\alpha_a$ and $\alpha_b$.

| $V_a$ | | | $V_b$ | | |
|---|---|---|---|---|---|
| $\alpha_a$ | $Cx_a$ | $Cn_a$ | $\alpha_b$ | $Cx_b$ | $Cn_b$ |
| 25° | 0.23 | 0.17 | 25° | 0.23 | 0.09 |
| 35° | 0.35 | 0.12 | 35° | 0.36 | 0.06 |

With regard to the present invention, the data set forth above indicates that a mesh bar 35 having the shape depicted in FIGS. 5–7 and 18 exhibits substantially the same drag coefficient cx for equivalent value for the angles $\alpha_a$ and $\alpha_b$ regardless of the direction of water flow. Moreover, the data set forth above also indicates that the lift coefficients Cn for equivalent value for the angles $\alpha_a$ and $\alpha_b$ are in the same direction perpendicular to the plane of the FIG. regardless of the direction of water flow. However, the value of the lift coefficients $Cn_a$ for water flow coming from the left-hand side of FIG. 18 have a value approximately two times greater than the lift coefficients $Cn_b$ for water flow coming from the right-hand side of the FIG.

Figure 19:
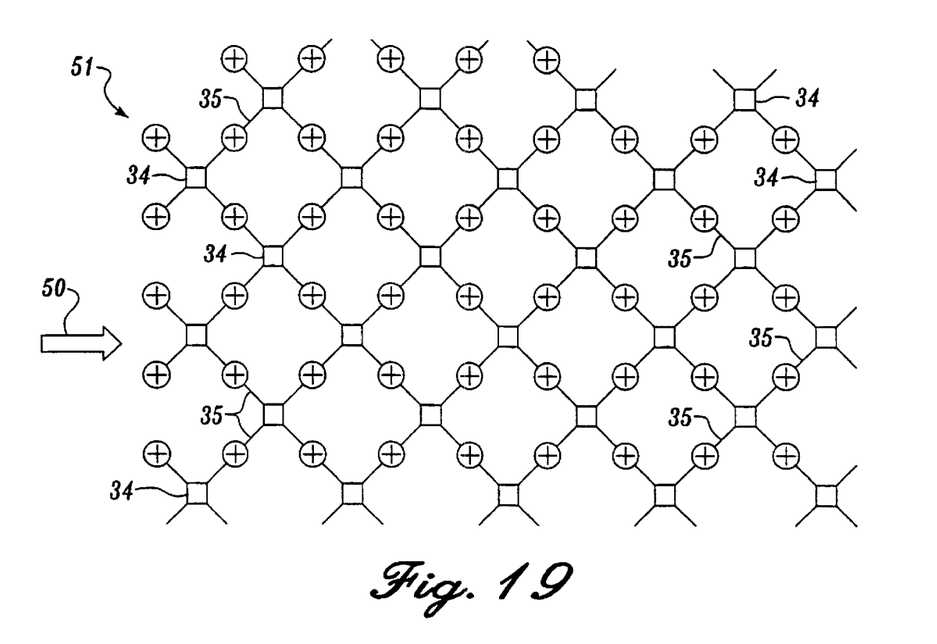
FIG. 19 is a plan diagram illustrating, similar to the illustration of FIGS. 4, a pattern used in knitting machine-made netting in accordance with the present invention that is adapted for inclusion into trawls.

Because mesh bars 35 in accordance with the present invention spiral or twist about the longitudinal axis of symmetry 38, netting 51 made with such mesh bars may exhibit a great deal of torque which make for difficult handling of the trawl 13 when being deployed from the towing vessel 10 into a water entrained environment. FIG. 19, similar to the illustration of FIG. 4, illustrates a pattern for machine-made netting 51 which, in comparison with FIG. 4, omits the L-shaped arrows 52 depicted in FIG. 4 even though product strands follow the same path from top to bottom across the netting 51 in both illustrations. Furthermore, the diagram of FIG. 19 adds to the illustration of FIG. 4 circles at the middle of each of the mesh bars 35 which, in the instance of FIG. 19, encircle a "+" symbol. These "+" symbols indicate the direction of the lay for the product strands 36 making up the mesh bars 35. Thus, similar to the illustration of FIG. 7 the illustration of FIG. 19 depicts machine-made netting 51 in which all the product strands 36 have the same lay, and which therefore the netting 51 depicted in FIG. 19 exhibits a large amount of torque.

Figure 20:
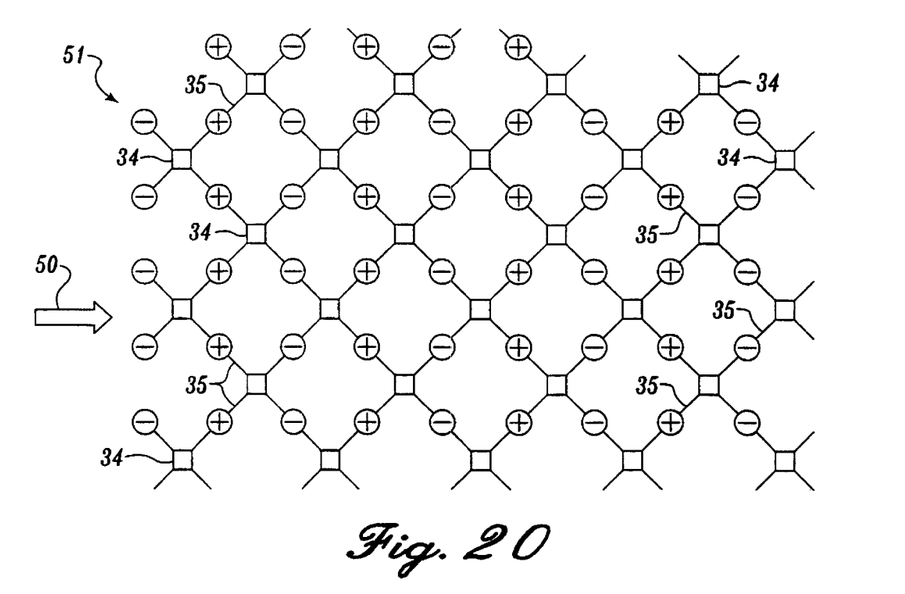
FIG. 20 is a plan diagram illustrating, similar to the illustration of FIGS. 4 and 19, a pattern used in knitting machine-made netting in accordance with the present invention that is adapted for inclusion into trawls.

In comparison with the lay for the mesh bars 35 depicted in FIG. 19, the knitting pattern illustrated in FIG. 20 seeks to reduce the torque inherent of netting 51 made with mesh bars 35 of the present invention. The diagram of FIG. 19 replaces "+" symbols in every other column of mesh bars 35 with "−" symbols to indicate a lay direction for the product strands 36 that is opposite to the lay direction for mesh bars 35 marked with the "+" symbols. Thus, the product strands 36 forming the mesh bars 35 in vertical columns of zig-zag mesh bars 35 in which the circles all contain a "+" symbol all the mesh bars 35 have the same lay direction. Conversely, the product strands 36 forming the mesh bars 35 in vertical columns in which the circles all contain a "−" all the mesh bars 35 have the same lay in a direction which is opposite to that for mesh bars 35 marked with a "+" symbol. Arranging the lay of product strands for every other zig-zag column of mesh bars 35 in opposite directions attempts, on a column-by-column basis, to cancel torque in the netting 51. However, netting 51 made with product strands that has such a sequence of alternating lay directions exhibits a crinkled or corrugated appearance.

Figure 21:
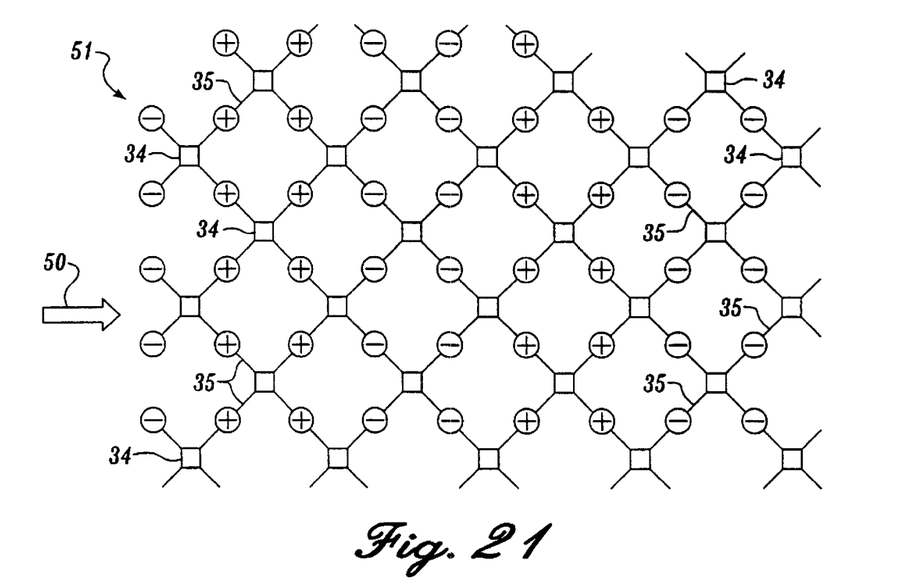
FIG. 21 is a plan diagram illustrating, similar to the illustrations of FIGS. 4, 19 and 20, a preferred pattern used in knitting machine-made netting in accordance with the present invention that is adapted for inclusion into trawls.

FIG. 21 illustrates a pattern used in knitting torque canceling machine-made netting 51 in accordance with the present invention that is preferred in comparison with the pattern illustrated in FIG. 20. In the illustration of FIG. 21, the lay of the mesh bars 35 alternate in pairs, i.e. two immediately adjacent zig-zag columns of mesh bars 35 have the same lay direction, and the lay direction reverses for alternative pairs of columns of product strands. Overall, this pair-wise organization for the lay of product strands for machine-made netting 51 produces a overall cancellation of torque for machine-made netting 51 having mesh bars 35 in accordance with the present invention while concurrently reducing the crinkled or corrugated appearance of the netting 51 that employs the lay configuration for the mesh bars 35 illustrated in FIG. 20.

Although the present invention has been described in terms of the presently preferred embodiment, it is to be understood that such disclosure is purely illustrative and is not to be interpreted as limiting. For example, for manufacturability the presently preferred embodiment for mesh bars 35 in accordance present invention employs the cross-sectional shape illustrated in FIGS. 5 and 6 which requires that the mesh bars 35 have a lay that spirals or twists about the longitudinal axis of symmetry 38. Conversely, as expressly stated above mesh bars 35 having the asymmetric cross-sectional shapes depicted in FIGS. 12–17, which exhibit better performance when twisted about the longitudinal axis of symmetry 38, may actually be used in accordance with the present invention for mesh bars 35 having a zero or null lay, i.e. without twisting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. At least two mesh bars (35) adapted for inclusion in a mesh cell (30) of netting (51), the mesh bars (35) comprising a continuous length of material having:
   a lay with a common direction throughout the length thereof;
   a cross-sectional shape selected from a group consisting of quasi-triangular (36a–36c and 60a–60c), L-shaped, Z-shaped, parallelogram and quasi-parallelogram; and
   a longitudinal axis of symmetry (38);

the two mesh bars (35) when included in the mesh cell (30) meeting at a coupler (34) at which the longitudinal axis of symmetry (38) of the continuous length of material turns, during field operations in which the netting (51) moves through a water entrained environment:

water flows past the mesh bars (35) respectively in two different directions with respect to the common lay thereof;

the directions in which water flows past the mesh bars (35) is neither parallel nor perpendicular to the longitudinal axis of symmetry (38) of the mesh bars (35); and as water flows past the mesh bars (35), the cross-sectional shapes of the mesh bars (35) produce a net component of force that is oriented in a direction perpendicular to a combined drag component of force for the mesh bars (35).

2. The mesh bars (35) of claim 1 wherein the cross-sectional shape selected for the continuous length of material is quasi-triangular and includes a plurality of product strands (36a–36c) arranged to spiral around an axis of symmetry of the mesh bar (35).

3. The mesh bars (35) of claim 2 wherein the several product strands (36a–36c) differ in diameter and are arranged to establish either an ascending or a descending size progression for the product strands (36a–36c).

4. The mesh bars (35) of claim 1 wherein the cross-sectional shape selected for the continuous length of material is quasi-triangular and includes a plurality of product strands (36a–36c) with the quasi-triangular cross-sectional shape twisting around an axis of symmetry of the mesh bar (35).

5. The mesh bars (35) of claim 4 wherein the several product strands (36a–36c) differ in diameter and are arranged to establish either an ascending or a descending size progression for the product strands (36a–36c).

6. The mesh bars (35) of claim 1 wherein the cross-sectional shape selected for the continuous length of material is quasi-triangular and includes a plurality of product strands (60a–60c) that serpentine asymmetrically around a longitudinal axis of symmetry (38) of the mesh bar (35) to establish either an ascending or a descending size progression for the product strands (60a–60c).

7. The mesh bars (35) of claim 1 wherein the continuous length of material has an asymmetric cross-sectional shape.

8. Netting (51) adapted for inclusion in a trawl (13), the netting (51) comprising:

mesh cells (30) having pairs of mesh bars (35) formed from continuous lengths of material:

each length of material having:
a lay with a common direction throughout the length thereof;
a cross-sectional shape selected from a group consisting of quasi-triangular (36a–36c and 60a–60c), L-shaped, Z-shaped, parallelogram and quasi-parallelogram; and
a longitudinal axis of symmetry (38);

each pair of mesh bars (35) formed by a single continuous length of material meeting at a coupler (34) at which the longitudinal axis of symmetry (38) of the continuous length of material turns, during field operations in which the trawl (13) is towed through a water entrained environment:

water flows past pairs of the mesh bars (35) respectively in two different directions with respect to the common lay thereof;

the directions in which water flows past the mesh bars (35) is neither parallel nor perpendicular to the longitudinal axis of symmetry (38) of the mesh bars (35); and as water flows past the mesh bars (35), the cross-sectional shapes of the mesh bars (35) produce a net component of force that is oriented in a direction perpendicular to a combined drag component of force for the mesh bars (35).

9. The netting (51) of claim 8 wherein the cross-sectional shape selected for continuous lengths of material is quasi-triangular and includes a plurality of product strands (36a–36c) arranged to spiral around an axis of symmetry of the mesh bar (35).

10. The netting (51) of claim 9 wherein the several product strands (36a–36c) differ in diameter and are arranged to establish either an ascending or a descending size progression for the product strands (36a–36c).

11. The netting (51) of claim 8 wherein the cross-sectional shape selected for continuous lengths of material is quasi-triangular and includes a plurality of product strands (36a–36c) with the quasi-triangular cross-sectional shape twisting around an axis of symmetry of the mesh bar (35).

12. The netting (51) of claim 11 wherein the several product strands (36a–36c) differ in diameter and are arranged to establish either an ascending or a descending size progression for the product strands (36a–36c).

13. The netting (51) of claim 8 wherein the cross-sectional shape selected for continuous lengths of material is quasi-triangular and includes a plurality of product strands (60a–60c) that serpentine asymmetrically around a longitudinal axis of symmetry (38) of the mesh bar (35) to establish either an ascending or a descending size progression for the product strands (60a–60c).

14. The netting (51) of claim 8 wherein continuous lengths of material has an asymmetric cross-sectional shape.

15. A product strand (36, 36a–36c, 60 and 60a–60c) adapted for inclusion in a pair of mesh bars (35) of a mesh cell (30) of netting (51), the product strand (36, 36a–36c, 60 and 60a–60c) comprising a continuous length of material having:

a lay with a common direction throughout the length thereof;

a longitudinal axis of symmetry (38); and a cross-sectional shape selected from a group consisting of quasi-triangular (36a–36c and 60a–60c), L-shaped, Z-shaped, parallelogram and quasi-parallelogram which, while no torque is applied to the product strand, rotates about the longitudinal axis of symmetry (38) along the length of material;

the pair of mesh bars (35) formed from the product strand (36, 36a–36c, 60 and 60a–60c) when included in the mesh cell (30) meeting at a coupler (34) at which the longitudinal axis of symmetry (38) of the continuous length of material turns, during field operations in which the netting (51) moves through a water entrained environment:

water flows past the mesh bars (35) respectively in two different directions with respect to the common lay thereof;

the directions in which water flows past the mesh bars (35) is neither parallel nor perpendicular to the longitudinal axis of symmetry (38) of the mesh bars (35); and as water flows past the mesh bars (35), the cross-sectional shapes of the mesh bars (35) produce a net component of force that is oriented in a direction perpendicular to a combined drag component of force for the mesh bars (35).

16. The product strand (36, 36a–36c, 60 and 60a–60c) of claim 15 wherein the cross-sectional shape selected for the continuous length of material is quasi-triangular and includes a plurality of product strands (36a–36c) arranged to spiral around an axis of symmetry of the mesh bar (35).

17. The product strand (36a–36c) of claim 16 wherein the several product strands (36a–36c) differ in diameter and are arranged to establish either an ascending or a descending size progression for the product strands (36a–36c).

18. The product strand (36, 36a–36c, 60 and 60a–60c) of claim 15 wherein the cross-sectional shape selected for the continuous length of material is quasi-triangular and includes a plurality of product strands (36a–36c) with the quasi-triangular cross-sectional shape twisting around an axis of symmetry of the mesh bar (35).

19. The product strand (36a–36c) of claim 18 wherein the several product strands (36a–36c) differ in diameter and are arranged to establish either an ascending or a descending size progression for the product strands (36a–36c).

20. The product strand (36, 36a–36c, 60 and 60a–60c) of claim 15 wherein the cross-sectional shape selected for the continuous length of material is quasi-triangular and includes a plurality of product strands (60a–60c) that serpentine asymmetrically around a longitudinal axis of symmetry (38) of the mesh bar (35) to establish either an ascending or a descending size progression for the product strands (60a–60c).

21. The product strand (36, 36a–36c, 60 and 60a–60c) of claim 15 wherein the continuous length of material has an asymmetric cross-sectional shape.

22. A product strand (36, 36a–36c, 60 and 60a–60c) adapted for inclusion in a pair of mesh bars (35) of a mesh cell (30) of netting (51), the pair of mesh bars (35) formed from the product strand (36, 36a–36c, 60 and 60a–60c) when included in the mesh cell (30) meeting at a coupler (34), the product strand (36, 36a–36c, 60 and 60a–60c) comprising a continuous length of material having:

a lay with a common direction throughout the length thereof;

a longitudinal axis of symmetry (38) which turns at the coupler (34); and a cross-sectional shape which:
 a. spirals along the longitudinal axis of symmetry (38); and
 b. is selected so that during field operations in which the netting (51) moves through a water entrained environment:
   i water flows past the mesh bars (35) respectively in two different directions with respect to the common lay thereof;
   ii. the directions in which water flows past the mesh bars (35) is neither parallel nor perpendicular to the longitudinal axis of symmetry (38) of the mesh bars (35); and
   iii. as water flows past the mesh bars (35), the cross-sectional shapes of the mesh bars (35) produce a net component of force that is oriented in a direction perpendicular to a combined drag component of force for the mesh bars (35).

* * * * *